(12) United States Patent
Wallace et al.

(10) Patent No.: US 7,068,758 B1
(45) Date of Patent: Jun. 27, 2006

(54) INTEGRATED METALLIC ACCESS FOR HIGH PORT DENSITY DSLAM

(75) Inventors: Donovan Wallace, Kinburn (CA); Geoffrey Dickinson, Kanata (CA); Kanwaljeet Jawanda, Kanata (CA); Sven A. Seelemann, Ottawa (CA); Robert Gillan, Lane Cove (AU)

(73) Assignee: Alcatel Canada Inc., Kanata (CA)

( * ) Notice: Subject to any disclaimer, the term of this patent is extended or adjusted under 35 U.S.C. 154(b) by 810 days.

(21) Appl. No.: 09/694,728

(22) Filed: Oct. 23, 2000

(51) Int. Cl.
*H04M 1/24* (2006.01)
*H04M 3/08* (2006.01)
*H04M 3/22* (2006.01)
*H04M 1/00* (2006.01)

(52) U.S. Cl. .............. 379/29.05; 379/15.01; 379/166; 379/399.01; 379/325

(58) Field of Classification Search ........ 379/1.01, 379/1.03, 1.04, 2, 9.06, 15.01, 16, 17, 22, 379/22.01, 22.07, 27.01, 29.01, 29.05, 166, 379/325, 327, 328, 399.01; 439/43, 297, 439/61, 62; 361/600, 636, 638, 640, 679, 361/686, 724, 725, 727, 728, 730, 736
See application file for complete search history.

(56) References Cited

U.S. PATENT DOCUMENTS

| | | | | |
|---|---|---|---|---|
| 5,526,344 A * | 6/1996 | Diaz et al. | ............ | 370/364 |
| 5,615,225 A * | 3/1997 | Foster et al. | ........ | 379/29.01 |
| 5,920,609 A * | 7/1999 | Toumani et al. | ...... | 379/27.01 |
| 6,229,814 B1 * | 5/2001 | McMillian et al. | ........ | 370/420 |
| 6,289,293 B1 * | 9/2001 | Huang | ............ | 702/117 |
| 6,297,958 B1 * | 10/2001 | Lutz, Jr. | ............ | 361/690 |
| 6,301,227 B1 * | 10/2001 | Antoniu et al. | ........ | 370/241 |
| 6,434,221 B1 * | 8/2002 | Chong | ............ | 379/27.01 |
| 6,496,566 B1 * | 12/2002 | Posthuma | ............ | 379/22 |
| 6,594,150 B1 * | 7/2003 | Creason et al. | ........ | 361/727 |
| 6,614,665 B1 * | 9/2003 | Witty et al. | ........ | 361/826 |
| 6,675,254 B1 * | 1/2004 | Wachel | ............ | 710/316 |
| 6,738,463 B1 * | 5/2004 | Schmokel | ............ | 379/166 |
| 6,757,386 B1 * | 6/2004 | Latu et al. | ............ | 379/416 |

\* cited by examiner

*Primary Examiner*—Quoc Tran

(57) ABSTRACT

A multi-services access platform is presented for supporting metallic test access in switching or multiplexing devices such as digital subscriber line access multiplexers (DSLAMs). The multi-services access platform includes a chassis within which a predetermined number of card slots are included. Each of the card slots includes a number of input/output ports. A backplane runs along the chassis and includes a metallic test access bus. The metallic test access bus is operable to selectively couple to one or more input/output ports within the line card slots of the chassis to establish one or more metallic test paths. A relay matrix may be used to provide the selective coupling for the metallic test access bus, and the flexibility provided by the configuration of the relay matrix supporting the metallic test access bus allows for a variety of different test access ports (TAPs) to be supported. Specific TAP configurations may be configured that support both a Safety Extra Low Voltage (SELV) rated stimulus and a Telecom Network Voltage (TNV) rated stimulus such that local loops that support a variety of different signaling protocols can be tested using the metallic test access bus either individually or concurrently.

23 Claims, 7 Drawing Sheets

Stimulus Portion
Layout 400

INTEGRATED METALLIC ACCESS FOR HIGH PORT DENSITY DSLAM

FIELD OF THE INVENTION

The invention relates generally to communication systems and more particularly to a method and apparatus for integrated metallic test access within a communication switch.

BACKGROUND OF THE INVENTION

Telephone and other communication systems often include a central office that serves as a hub that allows for individual users to connect to a broader communication network that includes other central offices. Such central offices can provide support for a variety of user applications including telephone service, digital subscriber line (DSL) service, etc.

FIG. 1 provides a graphical representation of a representative connection between a user and the central office. The central office includes a multiplexer or other switching device that provides a plurality of individual connections to some of the users supported by the central office. For a DSL application, the multiplexer may be a digital subscriber line access multiplexer (DSLAM) that provides DSL support for a plurality of users. Each user is connected to the central office via a local loop, which may be one or more pairs of wires that extend from the central office to the user's premises. At the customer's premises the local loop connects to a variety of customer equipment, such as telephones, computer modems, etc.

The local loop is subject to impairments. Some impairments are due to the natural environment (such as water, lightning, or electrical interference). Other impairments are due to the design of the network (such as bridge taps or load coils). Yet other impairments are due to errors made during the normal maintenance of the telecommunications network (such as incorrectly splicing pairs of wire together). All of these impairments impede the ability to provide telecommunication services; as an example, in the DSLAM application, load coils prevent the customer from using DSL at all while bridge taps reduce the bandwidth available (that is, the quality of the service) to the customer. Thus, the ability to test a customer's loop is very important to a telecommunications service provider.

Equipment that can test the customer loop is very expensive. Further, this test equipment in its normal operation inhibits the use of the customer loop for its intended purpose of providing telecommunications services. As a consequence, telecommunications service providers do not wish to deploy test equipment that is always coupled to all customer' loops. Rather, the service providers install sufficient test equipment to be able to test a reasonable subset of the customer loops and that can be selectively coupled to customer loops. This test equipment is installed in the central office nearest the customer.

Providing access to the local loop at the central office for test purposes may be referred to as providing metallic test access (MTA). The testing performed on the local loop using the MTA may include checking continuity, resistance, and other related electrical characteristics of the loop.

As the telecommunications networks have matured, regulatory agencies across the world have mandated that Incumbant Local Exchange Carriers (ILECs) provide the opportunity for Competitive Local Exchange Carriers (CLECs) to install telecommunications service equipment in central offices and provide competitive services. Naturally, CLECs must pay the ILECs for the space and power that their equipment consumes In prior art systems, isolating the local loop for tests either required a physical disconnection of the local loop from the telecommunications service circuitry and reconnection to the testing circuitry, or the inclusion of some type of access circuitry interspersed between the telecommunications service circuitry and the local loop. Manually reconnecting customer loops to perform testing is very expensive, not to mention error prone. As a result, dedicated equipment is used to provide the access circuitry. Network operators found it convenient to split the MTA access circuitry into separate functional units. The units that would be used to implement MTA within the central office can be (without loss of generality) referred to as a test head (TH) and metallic test access unit (MTAU), where the test head performs testing using the MTAU to couple to local loops. The test head which operates on a small number of ports is physically much smaller than the MTAU, as the MTAU operates on all possible local loops while maintaining all relevant telecommunication safety standards.

Having to include such dedicated circuitry between the telecommunications service circuitry and the local loop adds significant cost to the system, in terms of power used and implementation space. Furthermore, such dedicated access circuitry increases storage space requirements as it can add additional components to the rack of equipment included within the multiplexer. Also, this additional circuitry requires maintenance of its own. Particularly (but not exclusively) in the CLEC environment, these additional costs make providing cost effective service difficult.

Therefore, a need exists for a method and apparatus for providing metallic test access within telecommunications service equipment (such as DSLAM) that can be integrated with other portions of the telecommunications service equipment such that the added overhead is minimized.

DETAILED DESCRIPTION

Generally, the present invention provides a multi-services access platform which supports metallic test access. The multi-services access platform includes a chassis within which a predetermined number of card slots are included. Each of the card slots includes a number of input/output ports. A backplane runs along the chassis and includes a metallic test access bus. The metallic test access bus is operable to selectively couple to one or more input/output ports within the line card slots of the chassis to establish one or more metallic test paths. A relay matrix may be used to provide the selective coupling for the metallic test access bus, and the flexibility provided by the configuration of the relay matrix supporting the metallic test access bus allows for a variety of different test access ports (TAPs) to be supported. Specific TAP configurations may be configured that support both Safety Extra Low Voltage (SELV) rated and Telecom Network Voltage (TNV) rated interfaces such that local loops that support a variety of different signaling protocols can be tested using the metallic test access bus either individually or concurrently.

By incorporating the required interconnection and switching circuitry for metallic test access within the chassis of the switch, or DSLAM, the added external circuitry required in prior art systems is eliminated. By providing a flexible relay matrix for each of the I/O ports, the metallic test access bus can be implemented using a limited number of connectors such that space limitations within the chassis are not exceeded. Relative positioning of the various signal lines included in the metallic test access bus permits test stimuli to be concurrently applied to a low-voltage (SELV rated) interface and a high- voltage (TNV rated) interface via independent connections to the test bus and the response to such stimuli measured without violating the spacing requirements established to ensure that safety agency regulations are met, and crosstalk does not corrupt the testing stimulus or response.

Figure 1:
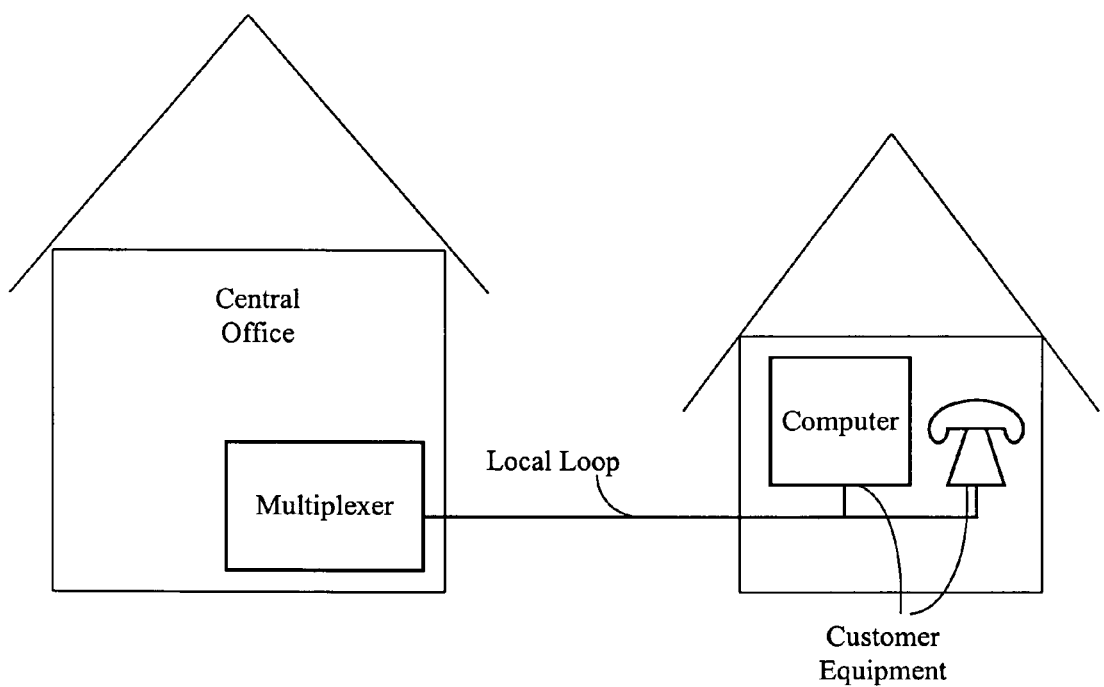
FIG. 1 illustrates a graphical representation of a central office connected to a customer via a local loop.
Figure 2:
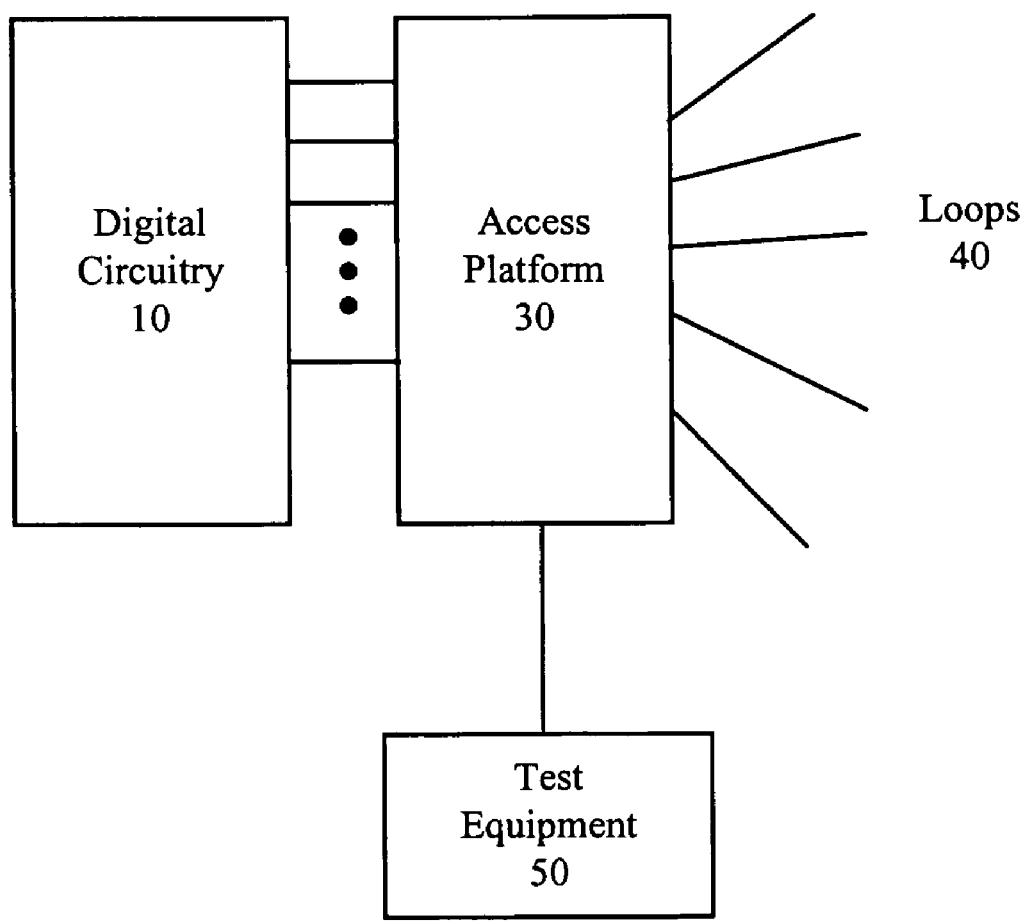
FIG. 2 illustrates a block diagram of a multiplexer such as a DSLAM that supports a plurality of loops in accordance with a particular embodiment of the present invention.

The invention can be better understood with reference to FIGS. 2–9. FIG. 2 illustrates a block diagram of a multiplexer or switch that may be associated with a central office that supports a number of loops 40, where each of the loops represents a physical link with a customer. The system illustrated in FIG. 2 represents a multi- services access platform that allows the test equipment 50 to access both the physical links represented by the loops 40 as well as the termination of those links, which is represented by the digital circuitry 10. The metallic test access (MTA) capabilities provided by the access platform 30 preferably meet the specifications provided by TELCORDIA (formerly BELLCORE). These specifications describe the industry standard MTA architecture and its components. The access platform 30 that allows for connection of the subscriber loops 40 to the test equipment 50 such that the test equipment 50 can run appropriate tests on the various pairs included in the loops 40. The entire testing operation is preferably controlled by a test operating support system (Test OSS).

As is described in additional detail below, the access platform 30 includes an MTA bus and a plurality of relays or other switching devices that form a relay/switching matrix that allows the MTA bus to selectively couple to one or more individual loops and/or one or more individual I/O ports corresponding to the line cards represented by the digital circuitry 10. The relays may be electromechanical relays or solid state relays, for example, solid state relays utilizing MOSFET devices. A controller within the access platform 30 provides an interface to the test OSS to allow for the proper configuration of the relay matrix to allow stimulus to be provided to, and responses to be received from, the various circuits being tested. This provides the functionality previously obtained using a MTAU, as described above; it is preferable to also emulate the functionality of the test head described above.

In prior art systems, the access platform was typically discrete hardware (such as a piece of rack equipment) coupled between the loops 40 and the I/O ports of the line cards included in the switching equipment to which the loops were coupled. As stated earlier, the additional hardware required to implement such a prior art access platform is costly both in terms of the added circuitry required, the additional space such circuitry takes up within the overall rack that holds the switching system, and the additional maintenance effort required.

TELCORDIA TECHNOLOGIES, INC. (formerly BELLCORE) promulgates widely-accepted standards for telecommunication equipment. "Network Equipment-Building System (NEBS) Requirements: Physical Protection" GR-63-CORE, Issue 1, October 1995, is one such standard. Section 2 "Spatial Requirements" of that standard specifies rack and cabinet size requirements in section 2.1 "General Requirements," with specific dimensional information given in section 2.2.2 "Equipment Frame Dimensions." Section 2.2.2 states as follows:

"[14] Equipment designed for traditional applications in established equipment environments should have the following nominal dimensions:

Height—2134 mm (7 ft)

Width—660 mm (2 ft, 2 in)

Depth—305 mm (12 in).

Frames may exceed the nominal dimensions for width and depth when placed in a special lineup where the minimum maintenance and wiring aisles can be maintained and the interface with the cable rack can be engineered.

Switching systems with lineups of equipment that include system cable racks may deviate from the nominal dimensions of width and depth and meet the requirements for lineup conformity in section 2.1."

While the present invention may be practiced so as to conform to the height, width, and depth dimensions specified above, the invention may also be practiced in accordance with the special lineup referred to above. For example, the invention may be practiced such that the dimensions of the chassis are each within three inches of standard dimensions.

Figure 3:
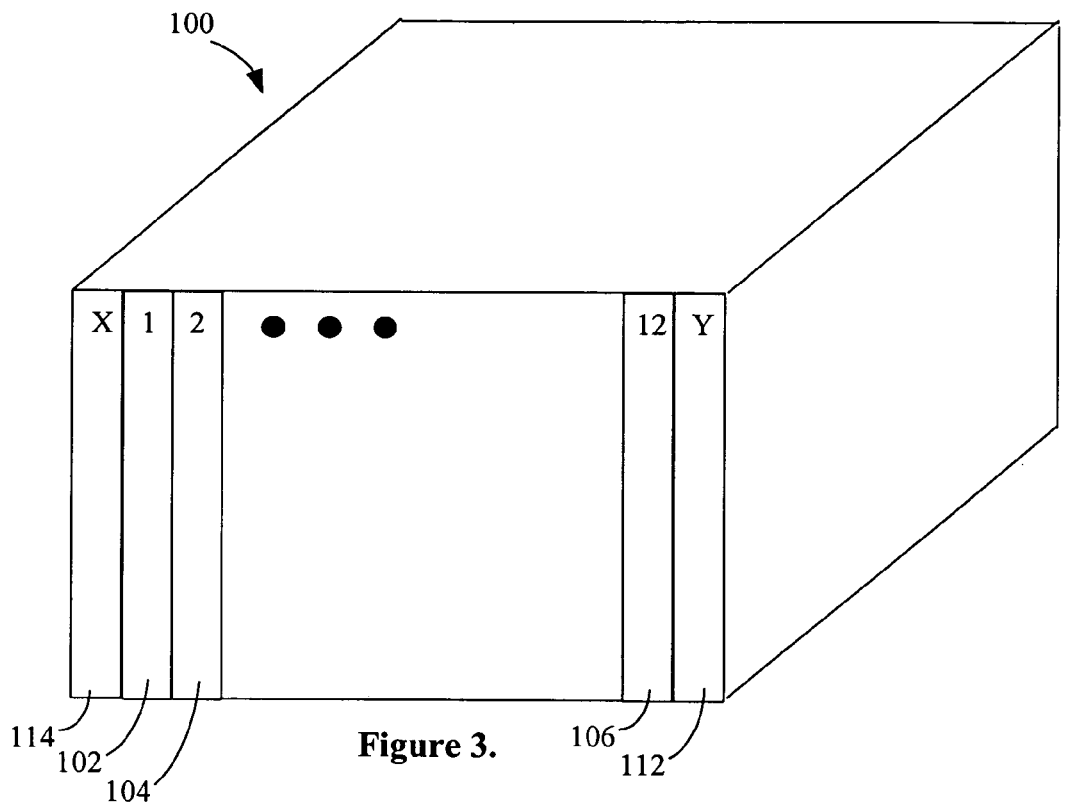
FIG. 3 illustrates a front view of a graphical representation of a chassis that includes a plurality of line cards that support an integrated metallic test access system in accordance with a particular embodiment of the present invention.

The present invention integrates the access platform into the chassis that holds the line cards for the switch, or the shelf included within the switch. FIG. 3 provides a graphical representation of a chassis 100, which includes a plurality of slots. The dimensions of the chassis are preferably not greater than approximately 18 inches wide, 22 inches tall, and 12 inches deep. These dimensions are in compliance with the above- referenced standards developed for equipment to be placed within racks of central offices. The control slots, or hubs, 112 and 114 support the switching fabric for the shelf. Universal card slots (UCS) 102–106 hold the line cards to which the loops supported by the shelf are coupled. In one embodiment, the chassis 100 holds 12 line cards and has two control slots to support the switching fabric for the shelf. The line cards within the chassis 100 may include ADSL line cards, SDSL line cards, other as yet unstandardized DSL systems, or line cards that support other interfaces such as T1, E1, POTS, DS3, E3, etc. A single chassis can support a number of different line cards, each of which presents a different type of interface.

In one embodiment, each of the line cards within the chassis supports 64 input/output (I/O) ports, where each I/O port is capable of coupling to a pair of connectors representing a local loop. The variety of different types of interfaces that may be supported by different line cards may present different signaling levels (for example, different voltage levels). Specifically, all forms of DSL (such as ADSL or SDSL) T1 and POTS may utilize higher voltage signaling, such as voltage levels compliant with Telecom Network Voltage (TNV) levels. TNV signaling levels may range up to approximately 300 volts in some normal signaling operations, with surges of voltage of the order of 600 volts and possible concurrent surges of current of approximately 40 amps. In contrast, DS3/E3 (and some T1/E1) interfaces may utilize Safety Extra Low Voltage (SELV) rated signaling, where this signaling utilizes voltage levels less than 5 volts in magnitude. Supporting such a variety of signaling levels presents additional challenges for integrated multi-services access platforms, and techniques for addressing such concerns are described in additional detail below.

Figure 4:
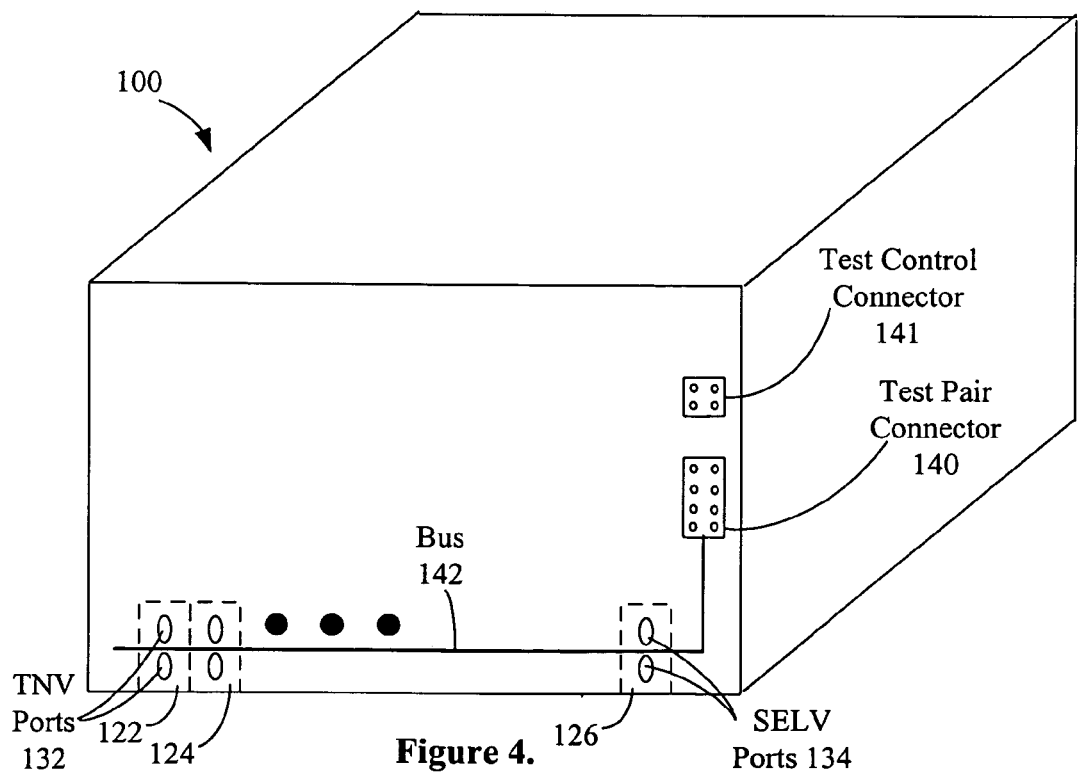
FIG. 4 illustrates a rear view of the chassis of FIG. 3.

FIG. 4 illustrates a rear view of the chassis 100. The chassis 100 is shown to include connectors corresponding to each of the line cards that may be included in the chassis 100. These ports 122–126 may include the TNV ports 132 as well as SELV ports 134. An MTA bus 142 runs along the back plane of the chassis 100. The MTA bus, as described earlier, may be selectively coupled to one or more of the I/O ports of the card slots to provide one or more metallic test paths. A connector 141 is provided to optionally allow an external test head to command the optional coupling of one or more I/O ports of the card slots to the metallic test paths. Connector 140 provides external equipment metallic access to the MTA bus.

In some embodiments, the test head that commands the selective coupling of the MTA bus is included within the chassis 100, whereas in other embodiments, the test head is external to the chassis 100 and coupled to the MTA bus 142 via a test connectors 140 and 141. In some embodiments, multiple shelves are stacked on top of each other where a single test head provides the appropriate control and stimulus information to each of the shelves. In such an instance, the test head may be external to all of the chassis corresponding to the shelves, or may be internal to one chassis and coupled to the other chassis via external connectors. (In all embodiments, the chassis 100 provides the MTA bus 142 and the corresponding control logic, providing the MTAU function.)

Figure 5:
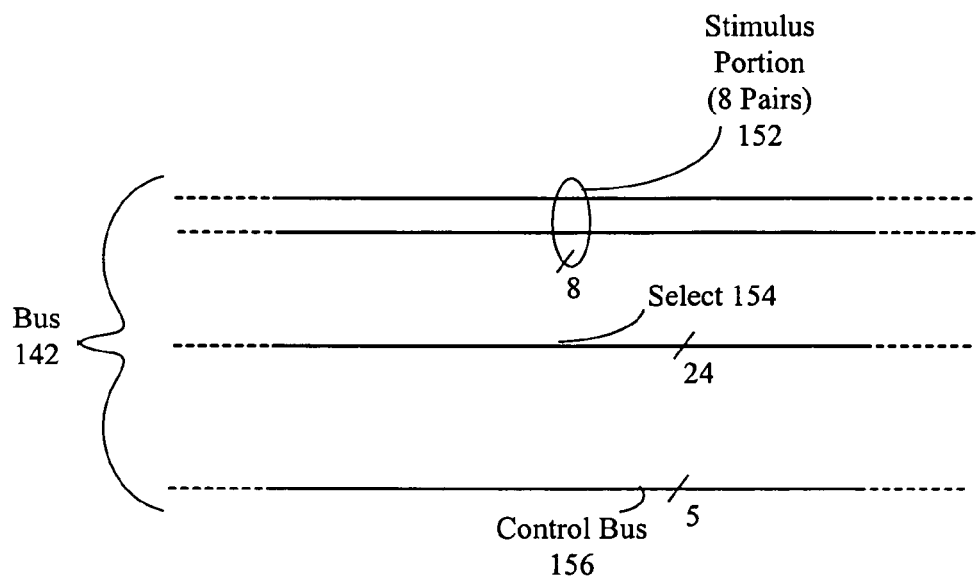
FIG. 5 illustrates a graphical representation of the various signals included in the metallic test access bus in accordance with a particular embodiment of the present invention.

FIG. 5 illustrates an example configuration of the MTA bus 142. The example shown in FIG. 5, the MTA bus 142 includes a stimulus portion 152 that is shown to include eight pairs of connectors. The MTA bus 142 also includes a control portion, where the control portion of the bus 142 illustrated in FIG. 5 includes select lines 154 (which may include 12 select lines and 12 lines that indicate the presence/absence of a line card in a corresponding slot) and 5 signal lines that make up a control bus 156. In other embodiments, the stimulus portion of the MTA bus may include a greater or lesser number of pairs, where the number of pairs included may determine the number and variety of test access port (TAP) standard configurations supported within the particular system. Thus, in another example system, only six conductor pairs are included within the stimulus portion 152, thus allowing for one complete TAP to be supported via the MTA bus 142.

A complete TAP consists of six pairs of connectors grouped into three sets: A, B, and C pairs. Each set (either A, B, or C) has a connector pair for the facility side (F pair) and a connector pair dedicated to the equipment side (E pair) side of the loop. Typically, pairs are labeled based on their set and connection point. Thus, the facility pair of the A set is identified as AF, and the equipment pair is identified as AE. In many cases, the C pairs are redundant, and thus a full tap is not always needed. By including eight pairs within the stimulus portion 152, two partial TAPs may be supported by the MTA bus 142 (two TAPs that each include, at most, A and B sets). Various TAP configurations are described in additional detail with respect to this specific layout of the stimulus portion 152 below.

The specific implementation of the MTA bus 142 on the back plane in the example shown in FIG. 5 may include eight pairs of traces for the stimulus portion 152. These traces span the entire back plane (both the control slots as well as the UCS slots) and may connect to the test connector 140 described with respect to FIG. 4 above. In a particular embodiment, the test connector 140 may be a DB-25 connector.

The select lines 154 of the MTA bus 142 may include individual card present and slot select signal lines corresponding to each of the UCS slots included within the chassis. The card present lines are used to determine whether or not there is a card present within a particular UCS slot, and the slot select signals are used to facilitate the provision of control information to a particular card slot for testing.

The control bus 156 may be a serial communication bus that includes a transmit signal, a receive signal, a clock signal, a frame pulse signal (an alignment signal), and an execute test signal. By using the control bus 156 to provide control information to the various portions of the relay matrix within the shelf, a variety of configurations can be achieved and multiple tests may be supported simultaneously. In a particular embodiment, two different partial TAPs can be established simultaneously using the MTA bus 142, and the control bus 156 can support two separate test routines (one on each TAP) concurrently. As is apparent to one of ordinary skill in the art, different control bus structures or different techniques for configuring the relay matrix and for providing the control information required to execute the tests may be used.

Figure 6:
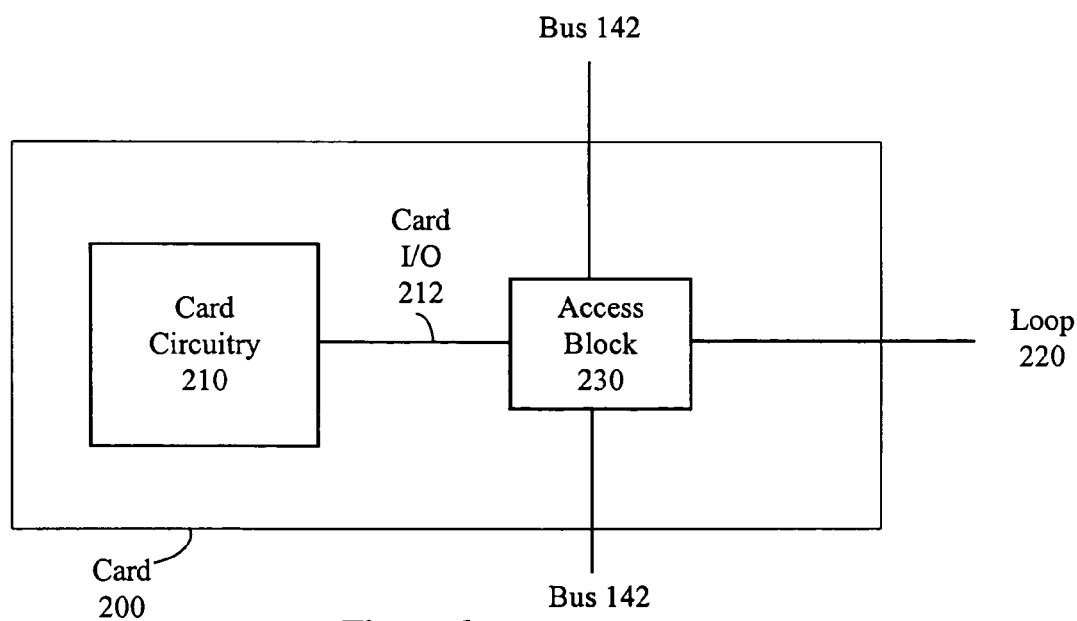
FIG. 6 illustrates a block diagram of a line card that is coupled to the metallic test access bus in accordance with a particular embodiment of the present invention.

FIG. 6 illustrates a graphical representation of a line card 200 that includes card circuitry 210 and an access block 230. The card circuitry 210 is coupled to the access block 230 via card input/output (I/O) signals 212. The access block 230 is also coupled to the various loops supported by the card 200. An example loop 220 is illustrated in FIG. 6. The MTA bus 142 is coupled to the access block 230 to provide configuration and other control information.

In some cases, the MTA bus 142 may be used to access the loop 220, whereas in other cases, the MTA bus 142 may be used to access the card I/O signals 212. In yet other cases, the MTA bus 142 may be used to access both the loop 220 and card I/O signals 212 concurrently. Thus, the MTA bus 142 may provide access to both the external loop circuitry for testing as well as the internal card circuitry 210.

Figure 7:
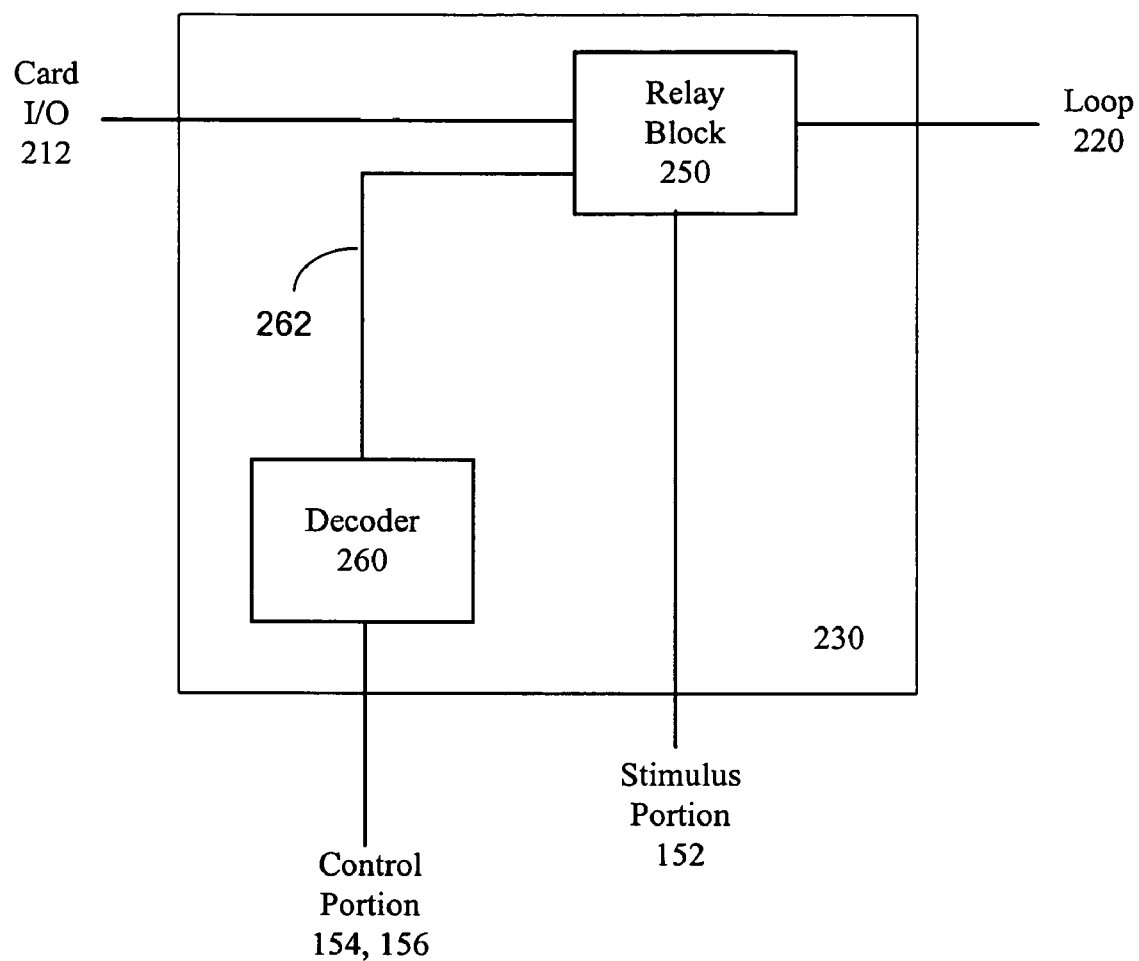
FIG. 7 illustrates a block diagram of an access block included in a line card in accordance with a particular embodiment of the present invention.

A more detailed view of an example access block 230 is provided in FIG. 7. The access block 230 of FIG. 7 includes a relay block 250 and a decoder 260. The decoder 260 is coupled to the control portion 154, 156 of the MTA bus 142, whereas the relay block 250 is coupled to the stimulus portion 152 of the MTA bus 142. The decoder 260 receives and transmits control information over the control bus 156 as well as one or more select lines 154. Based on the information received via the control portion, the decoder 260 generates relay control signals 262 that are provided to the various relays (or other switching devices) included in the relay block 250. The relay control signals 262 configure the relays within the relay block 250 such that the desired connections are established amongst the stimulus portion 152, the card I/O signals 212, and the loop 220.

Figure 8:
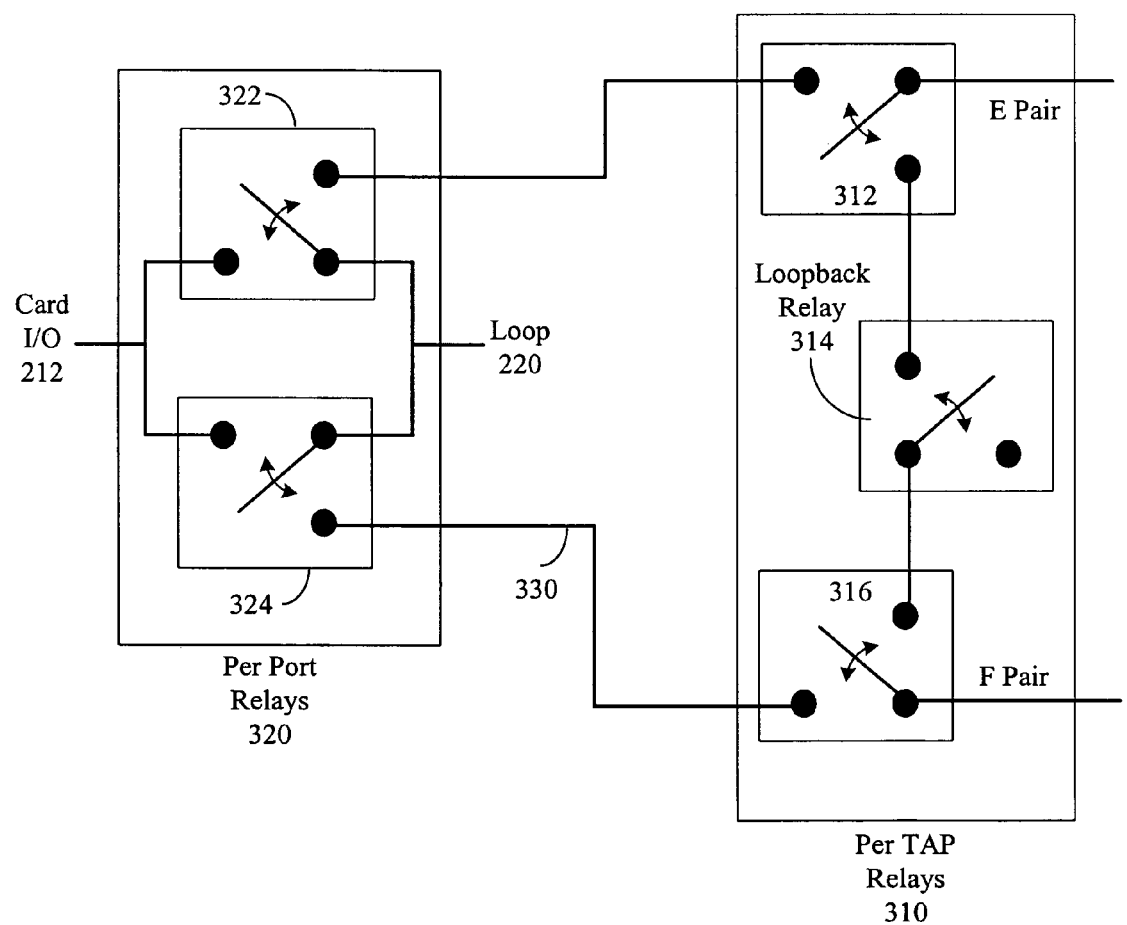
FIG. 8 illustrates a block diagram of the relay matrix utilized in the metallic test access system in accordance with a particular embodiment of the present invention.

Although a variety of relay configurations may be supported within the relay block 250, a specific example implementation is illustrated in FIG. 8. As stated above, each set (A, B, or C) within a TAP includes two pairs (E pair and F pair). The diagram of FIG. 8 shows the appropriate relays for a single set. The control signals provided to each of the relays are not illustrated in FIG. 8. The per TAP relays 310 include relays 312, 314, and 316. The relay 312 determines if the E pair is coupled to the per port relays 320 or the loopback relay 314. The F pair relay 316 determines whether the F pair is coupled to the per port relays 320 or the loopback relay 314. The loopback relay 314 determines whether or not the loopback path through the per TAP relays 310 is open or closed. Each of the relays 312, 316 is preferably a typical telecom-type relay that allows for two individual signal lines (a pair) to switch simultaneously.

If the relays 312 and 316 within the per TAP relays 310 are configured such that the E and the F pairs are coupled to the per port relays 320, various port configurations can be established to allow for a variety of testing paths. For example, the E and F pairs can be routed such that the test path includes the card I/O signals 212 such that the I/O card termination can be tested. In another configuration, a test path is established such that loop 220 is included in the test path. In both of these configurations, the user path (the path between the loop 220 and the card I/O 212) is disconnected.

In other configurations, the testing circuitry may be connected in such a manner that it is effectively inserted between the card I/O 212 and the loop 220. In yet other embodiments, it may be desirable to have a monitoring configuration such that the user path is not disconnected, and the testing equipment is connected in parallel with the loop 220 such that the transmissions between the card I/O 212 and the loop 220 can be effectively monitored. In order to facilitate such monitoring, a high impedance buffer may be included along the signal line 330. Note that this high impedance buffer may be switched into or out of the circuitry using additional relays that can be controlled using the MTA bus.

These various configurations are attainable through the use of relays 322 and 324. A set of per port relays 320 is provided for each of the ports within a line card slot.

Figure 9:
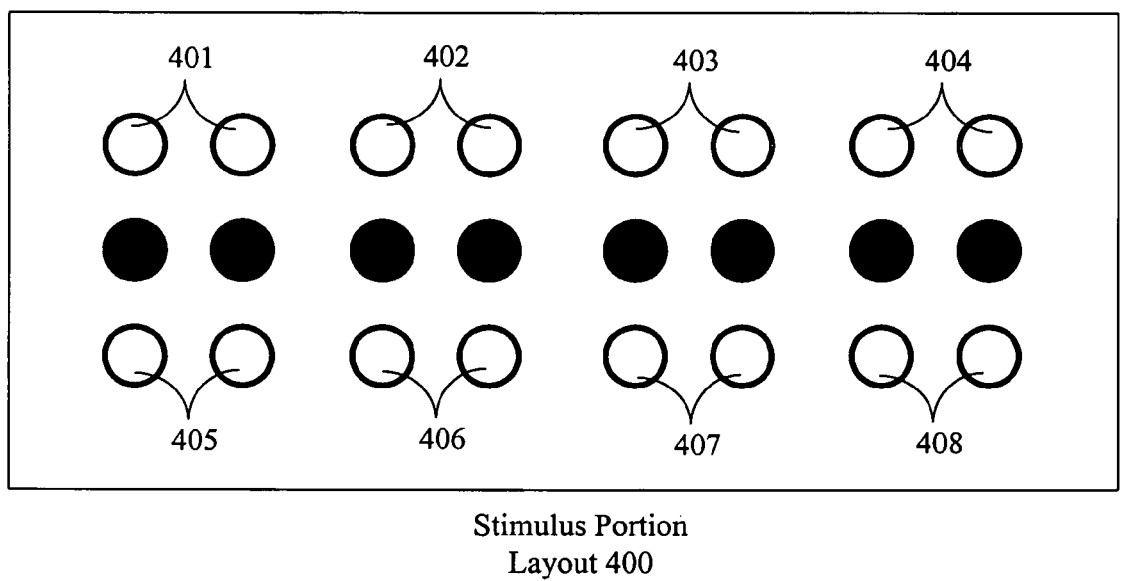
FIG. 9 provides a graphical representation of the layout of the stimulus portion of the metallic test access bus in accordance with a particular embodiment of the present invention.

FIG. 9 illustrates a graphical representation of the stimulus portion layout 400, which corresponds to the positioning of the various conductors associated with the stimulus portion along the back plane of the shelf. (Note that, in FIG. 9, the solid circles represent pins in a connector that are not stuffed (i.e., the pins are not installed). Not stuffing some pins insures that normal telecommunications safety practice is maintained by providing adequate insulative space between pins that are installed and used.) The shelf has eight pairs of traces for the stimulus portion of the MTA bus, where these traces span the entire back plane. The pairs 401-408 are arranged in a rectangle on the back plane connector as shown in the stimulus portion layout 400 of FIG. 9. In a particular embodiment, the spacing between adjacent pins center to center is approximately 0.08 inches. Based on the spacing requirements corresponding to TNV and SELV rated conductors, various configurations can be achieved with the layout 400 to ensure that tests on TNV and SELV rated circuits can be supported concurrently without interference between the two.

As indicated earlier, a full TAP is defined as three sets of pairs, where a set includes two of the pairs 401-408 illustrated in FIG. 9. Thus, a full TAP would utilize six of the eight pairs 401-408 available. In an example single TAP configuration, either SELV or TNV testing can be performed at one time and six of the eight pairs are utilized. In such a single, full TAP example, pairs 401 and 405 may constitute the A set, pairs 402 and 406 may constitute the B set, pairs 403 and 407 may be included in the C set, and pairs 404 and 408 may be left unconnected and thus unused.

As indicated earlier, it is often the case that a full TAP is not needed. If a full tap is not needed, two partial TAPS may be implemented concurrently. Each partial TAP might only include A pairs and B pairs such that having eight pairs of wires enables two partial TAPs (each having A and B pairs) to exist concurrently. In such an example, the first TAP may have pairs 401 and 405 as its A set and pairs 402 and 406 as its B set. The second TAP would include pairs 403 and 407 in its A set and pairs 404 and 408 in its B set.

In the case where concurrent SELV low voltage tests and TNV high voltage tests are desired, adequate separation between the conductors used for each type of testing must be ensured to avoid crosstalk or other signal contamination. For example, the minimum spacing requirements between a TNV conductor and a SELV conductor may be 1 mm clearance and 1.6 mm creepage along any surface (as per International Electrotechnical Commission Standard publication IEC60950). In order to ensure these margins are met, the partial TAPs may be further reduced such that one of the TAPs only includes an A set. Specifically, a first TAP used to perform TNV testing may include an A set made up of pairs 401 and 405. The second TAP, which may be used for SELV testing, may include an A set including pairs 403 and 407 and a B set including pairs 404 and 408. As such, pairs 402 and 406 are unused and therefore provide additional spatial buffering between the two TAPs.

In order to incorporate the circuitry required to support the integrated MTA testing within the shelf, line cards are preferably designed to include the relays and decoder blocks necessary for control. However, in order to promote compatibility with older systems, additional support cards can be used that include the decoder and relay circuitry, where the older cards plug into the support cards. As such, the older card configuration does not in itself change, and the support cards provide the added circuitry necessary to support integrated MTA testing. In a particular case, the older noncompliant cards have dimensions in comparison with the chassis body that permit the inclusion of a support card within each of the line card slots. Although backwards compatibility is desirable, future cards developed are preferably manufactured to include the support circuitry such that supplemental cards are not required.

In a specific example, the line cards manufactured for the 7470 (formerly 36170) switch produced by Alcatel Networks of Kanata, Ontario, Canada, are approximately 12 inches tall. If the chassis for the shelf is approximately 22 inches tall, this allows for the inclusion of a support card between the older 7470 line card and the line card slot within a newer chassis.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-services access platform, comprising:
   a chassis that includes:
      a predetermined number of card slots, wherein each of the card slots includes input/output ports; and
      a backplane that includes a metallic test access bus, wherein the metallic test access bus is operable to selectively couple to an input/output port of at least one of the card slots to provide at least one metallic test path.

2. The multi-services access platform of claim 1 wherein a first portion of the metallic test access bus is operable to selectively couple to an input/output port of a first card slot to provide a first metallic test path and a second portion of the metallic test access bus is operable to couple to an input/output port of a second card slot to provide a second metallic test path.

3. The multi-services access platform of claim 1, wherein selective coupling is accomplished using relays.

4. The multi-services access platform of claim 1, wherein the chassis further comprises a connector operably coupled to the backplane, wherein the connector provides access to the metallic test access bus from external to the chassis.

5. The multi-services access platform of claim 4 further comprises a test controller operably coupled to the connector, wherein the test controller is operable to provide stimulus over the at least one metallic test path.

6. The multi-services access platform of claim 1, wherein the metallic test access bus includes a control portion and a stimulus portion, wherein the control portion is operable to select to which of the card slots the metallic test access bus is coupled, wherein the stimulus portion is operable to convey stimulus to input/output ports to which the metallic test access bus is coupled.

7. The multi-services access platform of claim 6, wherein the control portion of the metallic test access bus includes a serial data communication link.

8. The multi-services access platform of claim 6, wherein the stimulus portion of the metallic test access bus includes at least six conductor pairs.

9. The multi-services access platform of claim 6, wherein the stimulus portion of the metallic test access bus includes at least eight conductor pairs.

10. The multi-services access platform of claim 6, wherein the stimulus conveyed includes at least one of a Safety Extra Low Voltage (SELV) rated stimulus and a Telecom Network Voltage (TNV) rated stimulus.

11. The multi-services platform of claim 10, wherein in a first configuration the metallic test access bus is operable to couple to an input/output port of a first card slot and an input/output port of a second card slot, wherein the metallic test access bus is operable to convey the SELV rated stimulus to the input/output port of the first card slot and to convey the TNV rated stimulus to the input/output port of the second card slot.

12. The multi-services access platform of claim 1 further comprises a first line card operably coupled to a first card slot of the predetermined number of card slots, wherein the metallic test access bus is operable to selectively couple to at least one of: an input/output port of the first card slot and an input/output port of the first line card.

13. The multi-services access platform of claim 1 further comprises a test controller within the chassis and operably coupled to the metallic test access bus.

14. The multi-services access platform of claim 1, wherein the predetermined number of card slots is at least 12 card slots.

15. The multi-services access platform of claim 1, wherein dimensions of the chassis are each within three inches of standard dimensions set forth in "Network Equipment-Building System (NEBS) Requirements: Physical Protection".

16. The multi-services access platform of claim 1, wherein dimensions of the chassis are not greater than approximately 18 inches wide, 22 inches tall, and 12 inches deep.

17. The multi-services access platform of claim 1 wherein each of the card slots includes at least 64 input/output ports.

18. A method for performing metallic test access testing, comprising:
   issuing control signals on a metallic test access bus included in a backplane of a chassis that includes a predetermined number of card slots, wherein each of the predetermined number of card slots has input/output ports, wherein the control signals operate to selectively couple the metallic test access bus to an input/output port of a first card slot to provide a first metallic test path;
   applying stimulus on the first metallic test path to produce a first response; and
   measuring the first response.

19. The method of claim 18, wherein issuing the control signals configures relays such that the metallic test access bus is selectively coupled to the input/output port of the first card slot.

20. The method of claim 18, wherein the control signals operate to selectively couple the metallic test access bus to the input/output port of the first card slot to provide the first metallic test path and further operate to selectively couple the metallic test access bus to an input/output port of a second card slot to provide a second metallic test path,
   wherein applying stimulus includes applying first stimulus on the first metallic test path to produce the first response and applying second stimulus on the second metallic test path to produce a second response,
   wherein measuring includes measuring the first and second responses.

21. The method of claim 20, wherein the first stimulus is a Safety Extra Low Voltage (SELV) rated stimulus and the second stimulus is a Telecom Network Voltage (TNV) rated stimulus.

22. The method of claim 18, wherein the stimulus is one of a Safety Extra Low Voltage (SELV) stimulus and a Telecom Network Voltage (TNV) stimulus.

23. The method of claim 18, wherein the control signals are issued over a control portion of the metallic test access bus and the stimulus is applied over a stimulus portion of the metallic test access bus.

* * * * *